US012746779B2

(12) United States Patent
Hirayama et al.

(10) Patent No.: US 12,746,779 B2
(45) Date of Patent: Sep. 29, 2026

(54) SADDLE-RIDING VEHICLE WHEEL DRUM

(71) Applicant: KAWASAKI MOTORS, LTD., Hyogo (JP)

(72) Inventors: Seiji Hirayama, Hyogo (JP); Hiroyuki Yamada, Hyogo (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 326 days.

(21) Appl. No.: 18/216,881

(22) Filed: Jun. 30, 2023

(65) Prior Publication Data

US 2025/0001800 A1 Jan. 2, 2025

(51) Int. Cl.
*B60B 27/02* (2006.01)

(52) U.S. Cl.
CPC ........ *B60B 27/02* (2013.01); *B60B 2310/202* (2013.01); *B60B 2310/204* (2013.01)

(58) Field of Classification Search
CPC ...... B60B 27/02; B60B 27/023; B60B 27/026
See application file for complete search history.

(56) References Cited

U.S. PATENT DOCUMENTS 2,290,451 A * 7/1942 Schwinn ............... B60B 27/023 301/6.9
2,489,934 A * 11/1949 Schwinn .................. B62M 9/10 192/64
2015/0290971 A1* 10/2015 Sagane ............... B60B 27/0005 301/109
2019/0030951 A1* 1/2019 Walthert ............. B60B 27/0031

FOREIGN PATENT DOCUMENTS

CN 217994000 U * 12/2022 ........... B60B 27/047
DE 2939867 C2 * 4/1989 ........... B60B 27/023
DE 102022128402 A1 * 5/2023 ........... B60B 27/047
EP 2221191 A1 * 8/2010 ............. F16D 41/36
WO WO-2022249065 A1 * 12/2022 ........... B60B 27/023

* cited by examiner

*Primary Examiner* — Kip T Kotter
(74) *Attorney, Agent, or Firm* — Greenblum & Bernstein, P.L.C.

(57) ABSTRACT

A saddle-riding vehicle wheel drum is formed of a cast or molded article and includes: a drum body including a cylindrical body section and a flange section formed on the drum body at each of axially opposite ends of the drum body; and an annular collar fitted to an inner circumferential surface of the drum body at one of the axially opposite ends.

2 Claims, 5 Drawing Sheets

SADDLE-RIDING VEHICLE WHEEL DRUM

BACKGROUND OF THE INVENTION

Field of the Invention

The present disclosure relates to a wheel drum for a saddle-riding vehicle such as a motorcycle and a method for manufacturing the same.

Description of Related Art

A wheel drum for saddle-riding vehicles that are designed for off-road use and are subjected to repeated jumping and landing is required to exhibit a high rigidity, especially against a landing load. One effective approach to achieving an increased rigidity is, for example, to widen the diameter of a body section of the wheel drum which joins flanges located on the opposite sides of the wheel drum. This, however, results in the expansion of a hollow cavity in the body section, with its diameter exceeding that of an opening which is defined in each of the flanges and used for insertion of an axle shaft. Because of this, a casting process for wheel drums that adopt this configuration requires the use of a mandrel or core. This is a drawback in terms of cost and manufacturability. Moreover, forming such a wheel drum in a forging process leads to more cost and is, therefore, not feasible for mass production.

SUMMARY OF THE INVENTION

The present disclosure is directed to providing a saddle-riding vehicle wheel drum, which has a body section with an outer diameter that is widened without using a mandrel or core to achieve an increased rigidity, and a method for manufacturing such a wheel drum.

To achieve this object, a first aspect of the present disclosure provides a saddle-riding vehicle wheel drum, the saddle-riding vehicle wheel drum being formed of a cast or molded article and including: a drum body including a cylindrical body section and a flange section formed on the body section at each of axially opposite ends of the body section; and an annular collar fitted to an inner circumferential surface of the drum body at one of the axially opposite ends.

According to this configuration, the wheel drum includes two separate and individually cast or molded components: the drum body, and the collar which is press-fitted to the drum body. With this configuration, a body diameter of the wheel drum can be widened without using a mandrel or core. As a result, an increased rigidity of the wheel drum is achieved.

The present disclosure provides a saddle-riding vehicle wheel, the saddle-riding vehicle wheel including: a wheel drum according to the first aspect of the present disclosure; bearings; and an axle shaft supported to the wheel drum at each of axially opposite ends of the wheel drum via a respective one of the bearings. One of the bearings at one of the axially opposite ends is mounted in place in an axially movable manner, and the other of the bearings at the other of the axially opposite ends is mounted in place in an axially immovable manner.

According to this configuration, a collar-side bearing at one of the axially opposite ends is mounted in place in an axially movable manner, while a drum body-side bearing at the other of the axially opposite ends is mounted in place in an axially immovable manner. This helps absorb a possible axial misalignment which is, for example, associated with the loosening of the press-fitted collar under a high load, etc., and thereby prevents the drum body from being displaced out of position together with a brake disc and a power transmission member mounted thereto. Thus, secure driving can be continued, because a sprocket, a brake disc, and the like are prevented from being displaced out of their mounted positions in a manner that impedes driving.

A second aspect of the present disclosure provides a saddle-riding vehicle wheel drum, the saddle-riding vehicle wheel drum being formed of a cast or molded article and including: a drum body including a cylindrical body section and a flange section formed on the body section at each of axially opposite ends of the body section; and a constriction located at an inner circumferential surface of the drum body with an axially decreasing diameter towards an exterior of the drum body.

According to this configuration, the constriction is prepared as a distinct element and integrated into the wheel drum in, for example, a friction welding process. With this configuration, the outer diameter of the body section can be widened without using a mandrel or core. As a result, an increased rigidity of the wheel drum is achieved.

The present invention provides a method for manufacturing a saddle-riding vehicle wheel drum, the method including: forming, in a casting or molding process, a drum body including a cylindrical body section and a flange section formed on the body section at each of axially opposite ends of the body section; forming an annular collar in a casting or molding process, as a distinct piece from the drum body; and connecting the annular collar to an inner circumferential surface of the drum body at one of the axially opposite ends. For example, the collar is fitted to the inner circumferential surface of the drum body at the one of the axially opposite ends. Alternatively, the collar may be connected, e.g., friction-welded, as an inseparable one piece to the inner circumferential surface of the drum body at the one of the axially opposite ends.

With this configuration, the outer diameter of the body section can be widened without using a mandrel or core. As a result, an increased rigidity of the wheel drum is achieved.

Any combinations of at least two features disclosed in the claims and/or the specification and/or the drawings should also be construed as encompassed by the present disclosure. Especially, any combinations of two or more of the claims should also be construed as encompassed by the present disclosure.

BRIEF DESCRIPTION OF THE DRAWINGS

The present disclosure will be more clearly understood from the following description of preferred embodiments made by referring to the accompanying drawings. However, the embodiments and the drawings are given merely for the purpose of illustration and explanation, and should not be used to delimit the scope of the present disclosure, which scope is to be delimited by the appended claims. In the accompanying drawings, alike numerals are assigned to and indicate alike parts throughout the different figures:

DESCRIPTION OF EMBODIMENTS

What follows is a description of preferred embodiments of the present disclosure made with reference to the drawings. The terms “front” and “forward” used herein refer to a side facing the direction of travel of a vehicle, whereas the terms “rear” and “rearward” used herein refer to a side facing a direction counter to the direction of travel of the vehicle. Thus, a longitudinal direction of the vehicle coincides with a “front-to-rear or rear-to-front direction.” Moreover, the terms “left” and “leftward” and the terms “right” and “rightward” used herein refer to sides facing the left and the right of the vehicle, respectively, as viewed from a driver seated in the vehicle. Accordingly, a left-to-right or right-to-left direction coincides with a vehicle widthwise direction. A “vehicle widthwise inside” refers to a side facing towards the longitudinally extending centerline of a vehicle body, whereas a “vehicle widthwise outside” refers to a side facing away from that centerline of the vehicle body.

Figure 1:
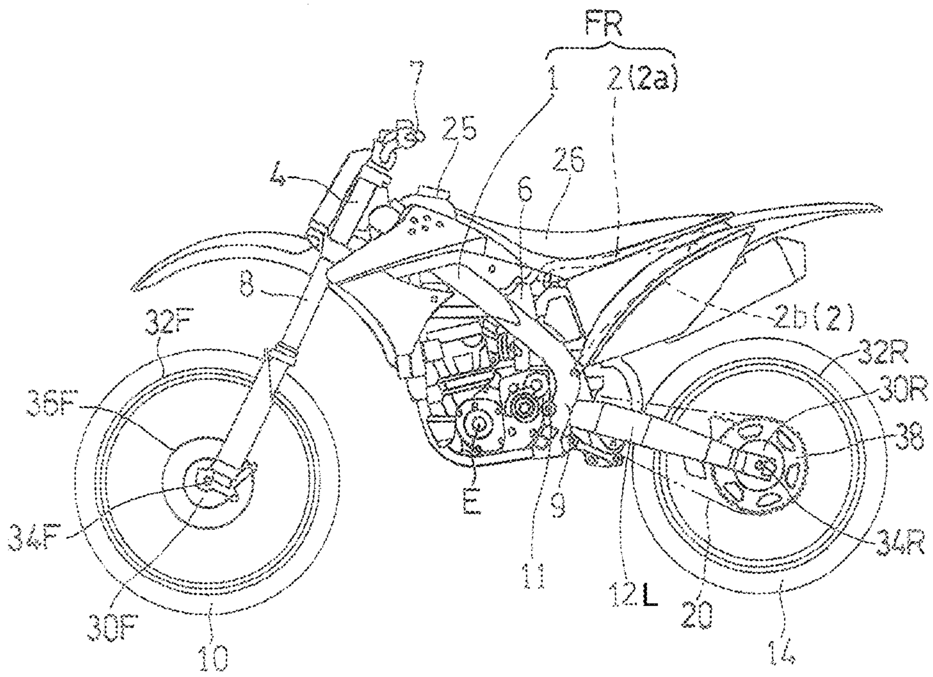
FIG. 1 shows a side view of one type of a saddle-riding vehicle in the form of a motorcycle, equipped with a wheel drum in accordance with a first embodiment of the present disclosure.

FIG. 1 shows a side view of one type of a s saddle-riding vehicle in the form of a motorcycle, equipped with a wheel drum in accordance with a first embodiment of the present disclosure. The motorcycle in FIG. 1 is designed for off-road riding use. It should be noted, however, that a motorcycle designed for off-road riding use is only one of non-limiting examples of a motorcycle according to the present disclosure.

The motorcycle includes a vehicle body frame FR. The vehicle body frame FR includes a main frame 1 and a rear frame 2 which form a front part and a rear part, respectively, of the vehicle body frame FR. The main frame 1 extends diagonally downwards from a front-end head pipe 4 towards the rear. In the instant embodiment, the main frame 1 includes a pair of main frames on the left and the right. The distance between the left and right main frames in a widthwise direction increases progressively towards the rear between the head pipe 4 and a central point of the main frames in a longitudinal direction, and remains generally constant from there on up to a rear end thereof. The left and right main frames 1 are bridged at a portion of a rear part thereof with a cross frame 6 extending in a widthwise direction. Then, the main frame 1 is curved downwards from behind the cross frame 6 so as to extend in a generally downward direction.

The rear frame 2 includes an upper rear frame piece 2*a* and a lower rear frame piece 2*b*. The upper rear frame piece 2*a* is coupled at a front end thereof to the cross frame 6 and extends rearwards from the cross frame 6. The lower rear frame piece 2*b* is coupled at a front end thereof to a lower part of the main frame 1. The lower rear frame piece 2*b* extends diagonally upwards from the main frame 1 towards the rear and is coupled at a rear end thereof to a rear part of the upper rear frame piece 2*a*.

A front fork 8 is rotatably supported on a head pipe 4 through a steering shaft (not shown). A steering handle 7 is fixed to an upper end of the front fork 8. A front wheel 10 is mounted to a lower end of the front fork 8.

In the instant embodiment, the front wheel 10 is a spoked wheel which includes a wheel drum 30F and a rim 32F that are connected with more than one spoke (not shown) and is turnably supported to the lower end of the front fork 8 by means of a front axle shaft 34F. A brake disc 36F is mounted to the wheel drum 30F.

A swingarm bracket 9 is arranged at a lower end of a rear part of the main frame 1. Mounted to the swingarm bracket 9 is a pivot shaft 11 about which each of the swingarms 12L, 12R is supported so as to be swingable up and down. A rear wheel 14 is supported at rear ends of the swingarms 12L, 12R.

In the instant embodiment, the rear wheel 14 is a spoked wheel which includes a wheel drum 30R and a rim 32R that are connected with more than one spoke (not shown) and is turnably supported to the rear ends of the swingarms 12L, 12R by means of a rear axle shaft 34R. Mounted to the wheel drum 30R are a brake disc 36R and a sprocket 38. The brake disc 36R is arranged on a right side of the rear wheel 14, whereas the sprocket 38 is arranged on a left side of the rear wheel 14. The features used to support the front wheel 10 and the rear wheel 14 will be discussed later.

An engine E serving as a power source for the motorcycle is located below and mounted to the main frame 1 in a forwardly facing fashion. While the engine E in the instant embodiment is a single-cylinder 4-cycle engine E, this is only one of non-limiting examples of the design of the engine E. The engine E drives the rear wheel 14 via a power transmission means 20 such as a drive chain. The power transmission means 20 is passed around the sprocket 38 on the rear wheel 14.

A fuel tank 25 is supported on the main frame 1. Fuel for the engine E can be stored in the fuel tank 25. The fuel tank 25 is located above the engine E. Present rearwards of the fuel tank 25 is a seat 26 which is supported on the upper rear frame piece 2*a*.

First Embodiment

Now, the features used to support the front wheel 10 and the rear wheel 14 are described. The features used to support the front wheel 10 and the features used to support the rear wheel 14 only differ in that the wheel drum 30R of the rear wheel 14 has the sprocket 38 mounted thereto. The features used to support the rear wheel 14 will be representatively treated in the present discussion.

In the instant embodiment, the wheel drum 30R is formed of a cast article of an aluminum alloy, for example. It should be noted, however, that an aluminum alloy is only one of non-limiting examples of the material of the wheel drum 30R.

Figure 2:
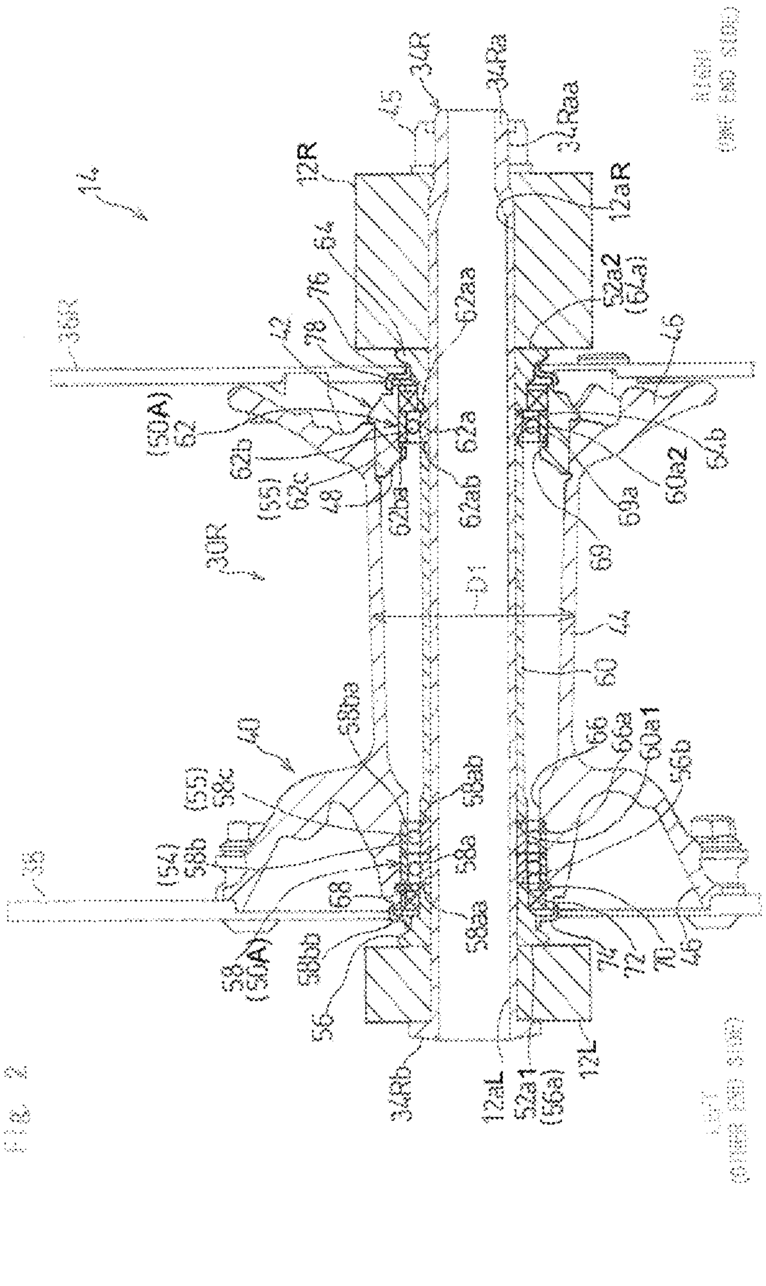
FIG. 2 shows a horizontal cross section of the wheel drum.

As illustrated in FIG. 2, the wheel drum 30R in the instant embodiment includes a drum body 40 and a collar 42 which is fitted to the drum body 40. The drum body 40 and the collar 42 are individually cast, distinct articles. Thus, the wheel drum 30R in the instant embodiment includes two separate and individually cast components and is constructed by assembling one on the other.

The drum body 40 includes a cylindrical body section 44 and a flared flange section 46 formed on the body section 44 at each of axially opposite ends of the body section 44. The drum body 40 is positioned such that a central axis of the body section 44 is oriented along a vehicle widthwise direction (a left-to-right or right-to-left direction). The sprocket 38 is detachably mounted on the left flange section 46, whereas the brake disc 36R is detachably mounted on the right flange section 46. Consequently, the sprocket 38 and the disc brake 36R are supported on the drum body 40.

The collar 42 is an annular cast article and is fitted to an inner circumferential surface of the drum body 40 at one of the axially opposite ends, namely, a right end. Thus, an outer diameter of the collar 42 is generally identical to an inner diameter of the right end of the drum body 40, whereas an inner diameter of the collar 42 is smaller than the inner diameter of the right end of the drum body 40. In other words, a constriction 48 is formed at the inner circumferential surface of the drum body 40 and defines an axially decreasing diameter towards an exterior (or, in the instant embodiment, a right side) of the drum body 40. In the following discussion, a right side of a vehicle body will be denoted as the one end side of the drum body 40 in an axial direction, while a left side of the vehicle body will be denoted as the other end side of the drum body 40 in the axial direction.

The drum body 40 has a hollow bore through which the rear axle shaft 34R is inserted. The drum body 40 is rotatably supported on the rear axle shaft 34R by means of a bearing arrangement 50A interposed therebetween. The bearing arrangement 50A includes an inner member serving as a stationary member, an outer member 54 serving as a rotational member, and rolling elements 55 interposed between the inner and outer members. The rolling elements 55 are located at each of axially opposite ends of the wheel drum 30R. Accordingly, the wheel drum 30R is supported on the axle shaft 30R at each of the axially opposite ends.

The inner member of the bearing arrangement 50A has a cylindrical shape and is inserted through the hollow bore of the drum body 40. The inner member has axially opposite end faces 52*a*1, 52*a*2 that are positioned externally of the end faces of the drum body 40.

The rear axle shaft 34R has one end (or a right end) that defines a smaller diameter portion 34Ra. The smaller diameter portion 34Ra has an outer circumferential surface with a male threading 34Raa formed thereon. The rear axle shaft 34R has the other end (or a left end) that defines a flange-like larger diameter portion 34Rb.

The rear axle shaft 34R is inserted from a left side of the vehicle body into a hollow hole 12*a*L in a left swingarm 12L, a hollow bore in the inner member, and a hollow hole 12*a*R in a right swingarm 12R in this order. Then, a nut 45 is tightened onto the male threading 34Raa on the smaller diameter portion 34Ra. In this way, the left swingarm 12L is clamped between the larger diameter portion 34Rb of the rear axle shaft 34R and a left end face 52*al* of the inner member, whereas the right swingarm 12R is clamped between the nut 45 and a right end face 52*a*2 of the inner member. Thus, the rear axle shaft 34R and the inner member are fixed to the left and right swingarms 12L, 12R in such a manner that no relative rotation is possible therebetween.

The bearing arrangement 50A comprises, starting from the other end side in an axial direction (or a left side in FIG. 2), a first collar member 56, a double row, first rolling bearing 58, 58, a distancing collar 60, a second rolling bearing 62, and a second collar member 64. In the instant embodiment, the first and second rolling bearings 58, 62 are ball bearings that include an inner ring 58*a*, 62*a*, an outer ring 58*b*, 62*b*, and balls 58*c*, 62*c* serving as rolling elements interposed therebetween. The balls 58*c*, 62*c* are configured as the rolling elements 55 of the bearing arrangement 50A. It should be noted, however, that ball bearings are only one of non-limiting examples of the rolling bearings 58, 62; for example, they may comprise roller bearings having rolling elements in the form of cylindrical rollers or tapered rollers. Moreover, the first rolling bearing 58 and the second rolling bearing 62 may comprise different types of bearing.

In the instant embodiment, the inner member includes: the first collar member 56; the inner ring 58*a* of the double-row, first rolling bearing 58; the distancing collar 60; the inner ring 62*a* of the second rolling bearing 62; and the second collar member 64. Meanwhile, in the instant embodiment, the outer member 54 includes the outer ring 58*b* of the double-row first rolling bearing 58 and the outer ring 62*b* of the second rolling bearing 62.

The first collar member 56 has a cylindrical shape and has axial opposite ends, one of which faces the other end side in an axial direction and is located on the other end side of an end face, which faces the other end side, of the wheel drum 30R in an axial direction. Hence, an end face 56*a*, which faces the other end side in an axial direction, of the first collar member 56 forms the left end face 52*al* of the inner member which comes into abutment with the left swingarm 12L. An end face 56*b*, which faces the one end side in an axial direction, of the first collar member 56 is brought into abutment with an end face 58*aa*, which faces the other end side, of the inner ring 58*a* of the double-row, first rolling bearing 58.

The second collar member 64 also has a cylindrical shape and has axial opposite ends, one of which faces the one end side in an axial direction and is located on the one end side of an end face, which faces the one end side, of the wheel drum 30R in an axial direction. Hence, an end face 64*a*, which faces the one end side in an axial direction, of the second collar member 64 forms the right end face 52*a*2 of the inner member which comes into abutment with the right swingarm 12R. An end face 64*b*, which faces the other end side in an axial direction, of the second collar member 64 is brought into abutment with an end face 62*aa*, which faces the one end side, of the inner ring 62*a* of the second rolling bearing 62.

In this way, the first and second rolling bearings 58, 62 are located on the other end side and the one end side in an axial direction, respectively, with the two bearings 58, 62 sandwiching the distancing collar 60 therebetween. The distancing collar 60 comprises an elongated cylindrical member and has axially opposite end faces 60*a*1, 60*a*2 that are respectively brought into abutment with an end face 58*ab*, which faces the one end side, of the inner ring 58*a* of the first rolling bearing 58 and an end face 62*ab*, which faces the other end side, of the inner ring 62*a* of the second rolling bearing 62.

Accordingly, the wheel drum 30R is rotatably supported by means of the first rolling bearing 58 and the second rolling bearing 62 of the bearing arrangement 50A, at the axially opposite ends thereof. The drum body 40 is supported by means of the double-row, first rolling bearing 58, whereas the collar 42 is supported by means of the second rolling bearing.

More specifically, the outer ring 58*b* of the first rolling bearing 58 is brought into abutment, at an outer circumferential surface thereof, with the inner circumferential surface of the drum body 40. Meanwhile, the outer ring 62*b* of the second rolling bearing 62 is brought into abutment, at an outer circumferential surface thereof, with an inner circumferential surface of the collar 42.

The first rolling bearing 58 is secured in place in an axially immovable manner. In particular, the inner circumferential surface of the drum body 40 has a first step 66 which is formed on a segment thereof at the other end of the drum body 40 and defines an axially decreasing diameter towards the one end side. The first step 66 has a first stepped surface 66*a* which faces the other end side in an axial direction and with which an end face 58*ba*, which faces the one end side, of the outer ring 58*b* of the double-row, first rolling bearing 58 is brought into abutment. In this way, a displacement of the first rolling bearing 58 on the one end side in an axial direction is restricted.

The inner circumferential surface of the drum body 40 has an annular groove 68 which is formed in a portion thereof, on the other end of the drum body 40, which is located on the other end side of the first step 66. Fitted into the groove 68 is a snap ring 70 with which an end face **58*bb*, which faces the other end side, of the outer ring 58*b* of the double-row, first rolling bearing 58 is brought into abutment. In this way, a displacement of the first rolling bearing 58 on the other end side in an axial direction is restricted. In summary, the first rolling bearing 58** is secured in place in an axially immovable manner.

The second rolling bearing 62 is mounted in place in an axially movable manner. In particular, the inner circumferential surface of the collar 42 has a second step 69 which is formed thereon to define an axially decreasing diameter towards the other end side. The second step 69 has a second stepped surface **69*a* which faces the other end side in an axial direction and with which one end face 62*ba*, which faces the one end side, of the outer ring 62*b* of the second rolling bearing 62 is brought into direct or close abutment. In this way, a displacement of the second rolling bearing 62** towards the other end side in an axial direction is restricted.

Meanwhile, an axial displacement of the second rolling bearing 62 on the one end side in an axial direction is not restricted and promotes free movement. That is, the second rolling bearing 62 is axially movable. The collar 42 supported by means of the second rolling bearing 62 and press-fitted to the inner circumferential surface of the drum body 40 has a risk of being axially displaced out of alignment under a significant load on the wheel drum 30R. In the instant embodiment, the axially movable, second rolling bearing 62 can absorb such a possible axial misalignment.

The first collar member 56 has an outer circumferential surface on which a first seal member 72 is disposed. Also, a cup-shaped, first cap 74 is assembled on the outer circumferential surface of the first collar member 56 on the other end side (or the outside), in an axial direction, of the first seal member 72. The first seal member 72 and the first cap 74 prevent the ingress of foreign matters from the other end side into the interior of the drum body 40.

Similarly, the second collar member 64 has an outer circumferential surface on which a second seal member 76 is disposed. Also, a cup-shaped, second cap 78 is assembled on the outer circumferential surface of the second collar member 64 on the one end side (or the outside), in an axial direction, of the first seal member 76. The second seal member 76 and the second cap 78 prevent the ingress of foreign matters from the one end side into the interior of the drum body 40.

In the instant embodiment, the drum body 40 is supported by means of the double-row, first rolling bearing 58 or two, first rolling bearings 58, 58, on the other end side of the drum body 40 where the sprocket 38 is supported. Meanwhile, the drum body 40 is supported by means of a single, second rolling bearing 62, on the one end side of the drum body 40 where the brake disc 36R is supported. The two bearings 58, 58 are used to provide support on the side of the sprocket in the instant embodiment, because the load introduced via the sprocket 38 which serves as a power transmission member is greater than the load introduced via the brake disc 36R. It should be noted, however, that the numbers of the first and second rolling bearings 58, 62 employed in the instant embodiment, respectively, are only one of non-limiting examples according to the present disclosure. Moreover, the bearings on the one end side and the other end side may be provided in the same number.

Now, a method for manufacturing a wheel drum 30R for a saddle-riding vehicle according to the present disclosure will be described in connection with FIG. 3. The manufacturing method for a wheel according to the present disclosure includes a forming step S1 and a connecting step S2. At the forming step S1, the drum body 40 and the collar 42 are separately formed in a casting or molding process.

At the connecting step S2, the collar 42 is connected to the inner circumferential surface of the drum body 40 at the one of the axially opposite ends. In the instant embodiment, the collar 42 is press-fitted to the inner circumferential surface of the drum body. The assembly of a wheel drum 30R according to the present disclosure is thus completed.

Figure 5:
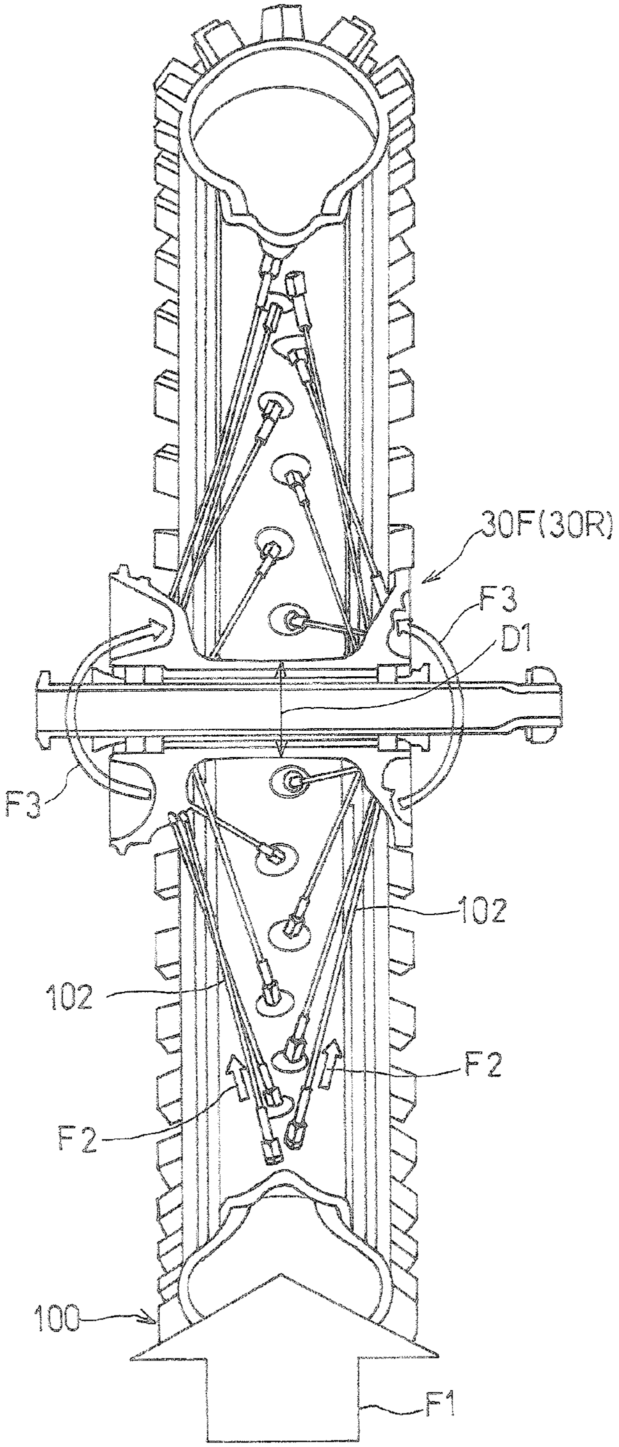
FIG. 5 shows a diagram which illustrates the mechanism of how a load may act on the wheel drum.

Now, the mechanism of how a load may act on the wheel drum 30R during driving will be described in connection with FIG. 5. For example, upon jumping and landing, an input force F1 is introduced via a tire 100. The input force F1 creates a load F2 that is applied to spokes 102. Further, the load F2 applied to the spokes 102 generates an instantaneous bending load F3 on the flanges 46 on the opposite sides of the wheel drum 30R.

Turning to FIG. 2, by widening an outer diameter D1 of the body section 44 (which may hereinafter be referred to as a "body diameter D1"), it is possible to increase the shear stiffness and the bending stiffness of the flanges 46 and thereby reduce deflection of the flanges 46. However, widening the outer diameter D1 of the body section 44 with no change in the diameter of the axle shaft 34R and the outer diameters of the flanges 46 will lead to expansion in the diameter of the hollow cavity in the body section 44 and, therefore, result in the formation of undercuts. Because of this, a casting process for wheel drums that adopt this configuration requires the use of a mandrel or core and, thus, poses a drawback in terms of cost and manufacturability. Moreover, a forging process is expensive and is, therefore, not feasible for mass production.

According to the abovementioned configuration, the wheel drum 30R shown in FIG. 2 includes two separate and individually cast or molded components: the drum body 40, and the collar 42 which is press-fitted to the drum body 40. With this configuration, a body diameter D1 of the wheel drum 30R can be widened without using a mandrel or core. As a result, an increased rigidity of the wheel drum 30R is achieved.

Also, the first rolling bearing 58 used to support the drum body 40 is mounted in place in an axially immovable manner, while the second rolling bearing 62 used to support the collar 42 is mounted in place in an axially movable manner. This helps absorb a possible axial misalignment which is, for example, associated with the loosening of the press-fitted collar 42 under a high load during driving. Consequently, the drum body 40 is prevented from being displaced out of position together with the brake disc 36R and the sprocket 38 supported thereon. Thus, secure driving can be continued, because the sprocket 38, the brake disc 36R, and the like are prevented from being displaced out of their mounted positions in a manner that affects driving.

Second Embodiment

Figure 4:
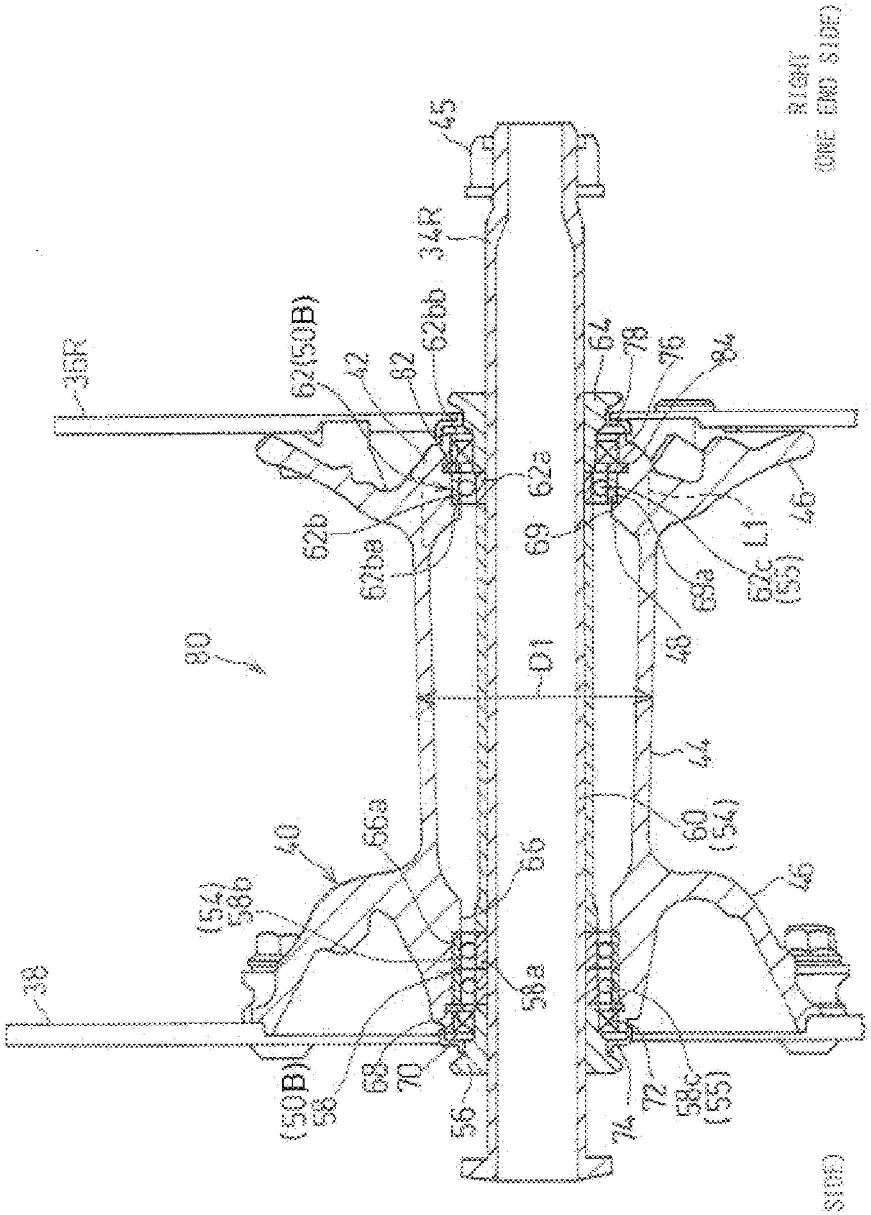
FIG. 4 shows a horizontal cross section of a wheel drum, in accordance with a second embodiment of the present disclosure.

FIG. 4 depicts a wheel drum 80 in accordance with a second embodiment of the present disclosure. While FIG. 4 representatively illustrates an example application of a wheel drum 80 in the second embodiment to a rear wheel, the wheel drum 80 in the second embodiment can also be applied to a front wheel. In the following discussion, features identical to those of the first embodiment in FIG. 2 will be indicated with the previous reference symbols and will not be described in detail to avoid redundancy.

The wheel drum 80 in the second embodiment differs from that in the first embodiment, in that a drum body 40 formed of a cast or molded article and a collar 42 likewise formed of a cast or molded article are connected as an inseparable one piece. In particular, the drum body 40 and the collar 42 in the second embodiment are integrated in a friction welding process. A broken line L1 in FIG. 4 indicates a connection formed between the drum body 40 and the collar 42. It should be noted, however, that this is only one of non-limiting examples of how the drum body 40 and the collar 42 can be connected. As in the first embodiment, the collar 42 has an inner circumferential surface that forms a constriction 48 with an axially decreasing diameter towards an exterior of the collar 42.

In the second embodiment, the drum body 40 and the collar 42 are connected as an inseparable one piece. For this reason, the collar 42 undergoes no axial displacement under a high load during driving. Hence, in the second embodiment, the second rolling bearing 62 of the bearing arrangement 50B is also secured in place in an axially immovable manner.

In particular, as in the first embodiment, a displacement of the second rolling element 62 on the other end side in an axial direction is restricted as a result of an end face 62*ba*, which faces the other end side, of the outer ring 62*b* of the second rolling bearing 62 being brought into abutment with the second stepped surface 69*a* of the second step 69.

Meanwhile, the inner circumferential surface of the collar 42 has an annular groove 82 which is formed therein on the other end side of the second step 69. Fitted into the groove 82 is a snap ring 84 with which an end face 62*bb*, which faces the one end side, of the outer ring 62*b* of the second rolling bearing 62 is brought into abutment. In this way, a displacement of the second rolling bearing 62 on the one end side in an axial direction is restricted. As such, the second rolling bearing 62 is secured in place in an axially immovable manner. The remaining features are identical to those of the first embodiment.

Figure 3:
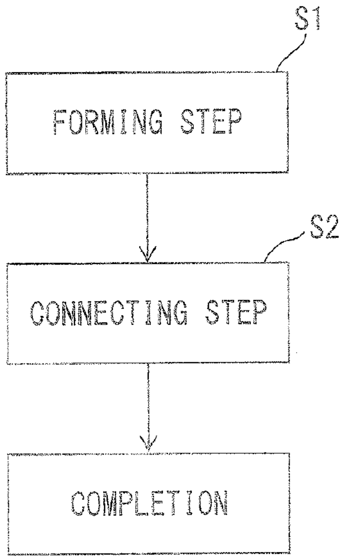
FIG. 3 shows a flowchart of a method for manufacturing the wheel drum.

As in the first embodiment, a method for manufacturing the wheel drum 80 in accordance with the second embodiment includes a forming step S1 and a connecting step S2 as shown in FIG. 3. What differs from the first embodiment is that, at the connecting step S2, the collar 42 is connected as an inseparable one piece to the drum body 40 in a friction welding process.

As with the first embodiment, the second embodiment makes it possible to widen the outer diameter D1 of the body section 44 shown in FIG. 4 without using a mandrel or core. As a result, an increased rigidity of the wheel drum 80 is achieved. Further, since the drum body 40 and the collar 42 are connected as an inseparable one piece, the collar 42 undergoes no axial displacement under a high load during driving. As such, both the first and second rolling bearings 58, 62 of the bearing arrangement 50B are secured in place in an axially immovable manner, thereby promoting stable support of the wheel drum 80.

While the first embodiment in FIG. 2 and the second embodiment in FIG. 4 are discussed on the basis of an example application of a wheel drum according to the present disclosure to a rear wheel, a wheel drum according to the present disclosure can also be applied to a front wheel. While a discussion around the preceding embodiments focused on examples in which a wheel drum according to the present disclosure can be applied to each of a front wheel and a rear wheel, a wheel drum according to the present disclosure may be applied to only one of a front wheel or a rear wheel.

The aforementioned embodiments are only some of non-limiting embodiments of the present disclosure, and various additions, modifications, or omissions can be made therein without departing from the principle of the present disclosure. A wheel drum according to the present disclosure can be suitably used with motorcycles which are designed for off-road riding use, which are subjected to repeated jumping and landing, and whose wheel drums are, therefore, required to exhibit a high rigidity. It should be noted, however, that a wheel drum according to the present disclosure can also be applied for use with any motorcycles including motorcycles not designed for off-road riding use. Moreover, it can also be applied for use with any saddle-riding vehicles other than motorcycles, such as three-wheeled vehicles and four-wheeled buggies. Accordingly, such variants are also encompassed within the scope of the present disclosure.

What is claimed is:

1. A saddle-riding vehicle wheel drum, the saddle-riding vehicle wheel drum being formed of a cast or molded article and comprising:

a drum body including a cylindrical body section and a flange section formed on the body section at each of axially opposite ends of the body section; and a constriction fitted to an inner circumferential surface of the drum body, the constriction defining an axially decreasing diameter towards an exterior of the drum body, wherein the constriction is arranged on an axial inboard side of a bearing, the saddle-riding vehicle wheel drum is supported via bearings, including the bearing, on an axle shaft, and the bearings are provided at each of axially opposite ends of the saddle-riding vehicle wheel drum.

2. A method for manufacturing a saddle-riding vehicle wheel drum comprising:

forming a drum body in a casting or molding process, the drum body including a cylindrical body section and a flange section formed on the body section at each of axially opposite ends of the body section;

forming an annular collar in a casting or molding process, as a distinct piece from the drum body;

connecting the annular collar as an inseparable one piece to an inner circumferential surface of the drum body at one of the axially opposite ends; and fitting a radially inner surface of the annular collar to a radially outer surface of a bearing, wherein the saddle-riding vehicle wheel drum is supported via bearings, including the bearing, on an axle shaft, and the bearings are provided at each of axially opposite ends of the saddle-riding vehicle wheel drum.

* * * * *